United States Patent [19]

Skold

[11] Patent Number: 5,057,251

[45] Date of Patent: Oct. 15, 1991

[54] DOUBLE-FOLD CONSTRUCTION FOR A CONTACT BODY ELEMENT

[75] Inventor: Jan O. Skold, Fort Myers, Fla.

[73] Assignee: Munters Corporation, Fort Myers, Fla.

[21] Appl. No.: 447,385

[22] Filed: Dec. 7, 1989

[51] Int. Cl.[5] .................... B01F 3/04

[52] U.S. Cl. .................... 261/112.2; 156/465; 156/204

[58] Field of Search .................... 261/112.2; 156/465, 156/204

[56] References Cited

U.S. PATENT DOCUMENTS

| | | | |
|---|---|---|---|
| 2,311,085 | 2/1943 | Rudolph | 156/465 |
| 3,155,153 | 11/1964 | Axelsson | 261/112.2 |
| 3,395,903 | 8/1968 | Norback et al. | 261/112.2 |
| 3,500,615 | 3/1970 | Meek | 261/112.2 |
| 3,574,032 | 4/1971 | Norback et al. | 261/112.2 |
| 3,801,419 | 4/1974 | Meek | 261/112.2 |
| 3,969,473 | 7/1976 | Meek | 264/90 |
| 4,099,928 | 7/1978 | Norback | 261/112.2 |
| 4,225,540 | 9/1980 | Kauschke | 261/112.2 |
| 4,251,312 | 2/1981 | Ziegler, Jr. et al. | 156/465 |
| 4,643,853 | 2/1987 | Braun | 261/112.2 |
| 4,650,532 | 3/1987 | Kloehn et al. | 156/204 |
| 4,732,713 | 3/1988 | Korsell | 261/112.2 |

FOREIGN PATENT DOCUMENTS

| | | | |
|---|---|---|---|
| 1314179 | 4/1973 | United Kingdom | 261/112.2 |

*Primary Examiner*—Tim Miles

*Attorney, Agent, or Firm*—Pasquale A. Razzano

[57] ABSTRACT

An improved contact body element, for use in forming the fill of a gas and liquid contact apparatus to produce interaction between a gas and liquid flowing through the apparatus, of the type having formed sheet members with a longitudinally extending edge of the sheet member folded over on a longitudinally extending surface of the corrugated member. This provides a strip of sheet material secured in overlapping relationship to the surface of the formed sheet member forming a full gap therebetween. An adhesive with intumescent qualities, which are triggered by heat, is applied within the fold such that the longitudinal edge and longitudinal surface in cooperation with the adhesive form a substantially rigid ply that is substantially resistant to erosion and can withstand higher compressive forces and which will expand in the event of fire, to block the openings between the sheets. The sheet edge may be slitted along its length to facilitate this blockage.

5 Claims, 1 Drawing Sheet

FIG. 1
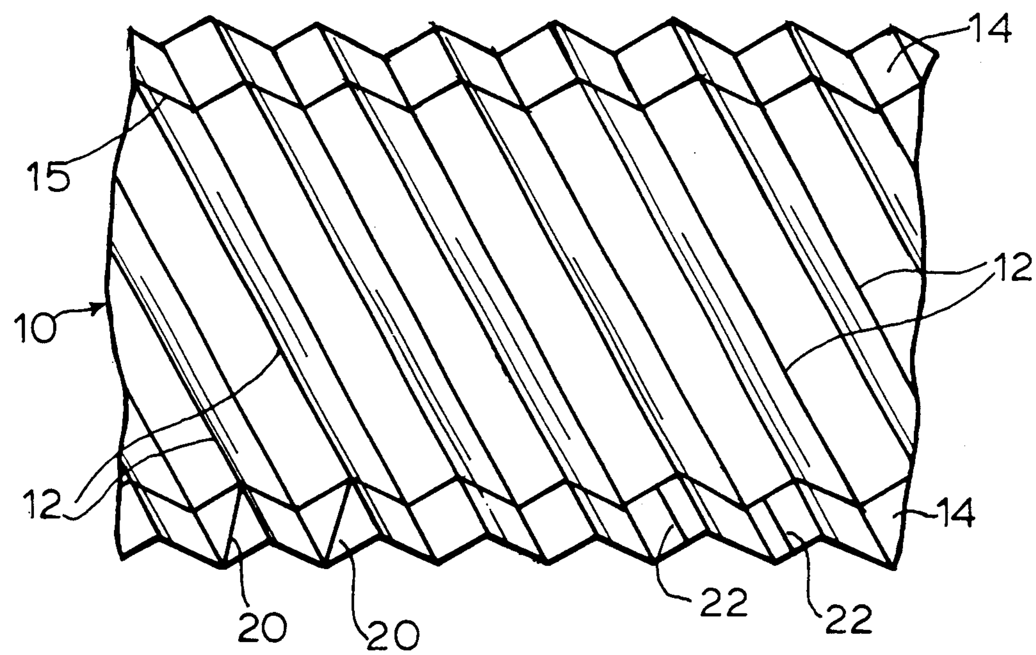
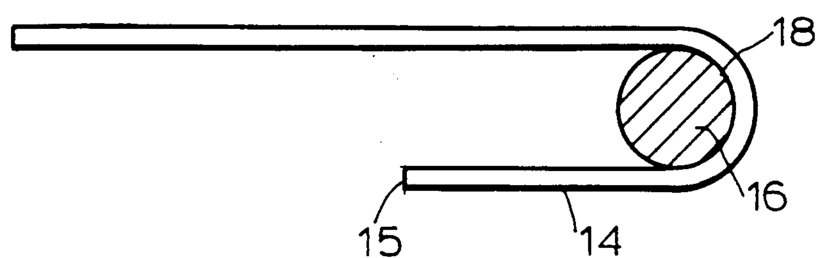
FIG. 2
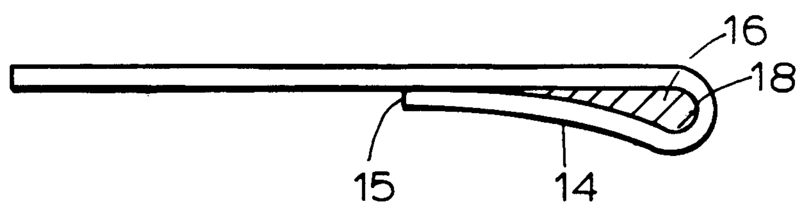
FIG. 3

DOUBLE-FOLD CONSTRUCTION FOR A CONTACT BODY ELEMENT

BACKGROUND OF THE INVENTION

1. Field of Invention

This invention relates generally to the art of contact body elements for gas and liquid contact apparatus, and more particularly, to an improvement to the double-folded edge construction disclosed in U.S. Pat. No. 3,801,419, the disclosure of which is specifically incorporated herein by reference. The improvement includes introducing an adhesive within the fold of the longitudinal edge such that the longitudinal edge and the adhesive form a substantially rigid ply that is substantially resistant to erosion. The longitudinally extending edge is thus able to withstand higher compressive forces and will not separate from the sheet in cases of high edge erosion thereby increasing the life expectancy of the fill and facilitating the handling and installation of the fill.

2. Description of the Art

A variety of different types of contact bodies have evolved for use in forming cooling tower fills. Representative of such contact bodies are U.S. Pat. Nos. 3,500,615 to Meek, 3,574,032 to Norback et al., and 4,225,540 to Kauschke. The primary goals of these contact bodies have been to reduce costs and minimize the weight of the resulting cooling tower structure or the air or gas scrubber. To achieve these goals, corrugated sheets with a reduced thickness are employed. However, with the reduction in thickness, there is a resulting loss in strength and the sheets including the fill, particularly at their edges, are often subject to damage, either during handling the initial flow of liquid, or more importantly, by high edge erosion.

In an attempt to strengthen the edges of the fill, as is disclosed in U.S. Pat. Nos. 3,395,903 and 3,574,032, corrugated sheets are secured together by means of glue beads which are applied along the edges of the layers, preferably along the upper and lower edges thereof. Additionally, it has been suggested in U.S. Pat. Nos. 3,395,903 and 3,574,032, that the mechanical strength of the layers or sheets can be improved by applying a plastic or resin in the form of a continuous bead along the layer edges, which when solidified, forms an additional strengthening edge-bulge. Further, according to U.S. Pat. No. 3,500,615 it is known to provide the corrugated strips with a bead of plastic material to toughen the face edges. However, although an adhesive has been applied to the edges of the corrugated sheets, the adhesive was not always able to withstand substantially higher compressive forces and high edge erosion.

OBJECTS AND SUMMARY OF THE INVENTION

Therefore, it is a general object of the present invention to provide a double-folded edge for corrugated layers or sheets of a contact body which avoids the above-described difficulties of the prior art.

It is also an object of the present invention to provide a double-folded edge for corrugated layers or sheets of a contact body which includes the introduction of a small amount of adhesive at the point of double-folding.

It is accordingly among the primary objects of this invention to provide an improved contact body element, or heat exchange element, suitable for use in forming the fill or decking of cooling towers or the like.

It is an additional object of the invention to provide a contact body element having a life expectancy better than that of presently available cooling tower fill.

It is a further object of this invention to provide a contact body element having a double-folded edge that is substantially resistant to erosion.

It is yet another object of this invention to provide a contact body element that is able to withstand higher compressive forces.

These and other objects of the invention are achieved in a contact body element for use in forming the fill of a gas and liquid contact apparatus which produces interaction between a gas and liquid flowing through the apparatus. The contact body element includes a corrugated sheet member having a plurality of linearly extending corrugations running across the sheet askew to a longitudinal axis of the sheet. A longitudinally extending edge of the sheet member is double-folded over on a longitudinally extended surface of the corrugated member to provide a strip of sheet material secured in overlapping relationship to the surface of the corrugated sheet member. An adhesive is applied within the double-fold such that the longitudinal edge and surface and adhesive form a substantially rigid ply that is substantially resistant to erosion and capable of withstanding higher compressive forces.

The above, and other objects, features and advantages of this invention, will be apparent in the following detailed description of an illustrative embodiment thereof which is to be read in connection with the accompanying drawings wherein:

BRIEF DESCRIPTION OF THE DRAWINGS

FIG. 1 is a perspective partial view of a contact body element showing the element formed with edge reinforcing plys;

FIG. 2 is a cross-sectional schematic view through an edge of the sheet illustrating a preferred embodiment of the present invention wherein the edge is partially folded with the addition of adhesive placed at the fold;

FIG. 3 is a cross-sectional schematic view of an edge of a sheet of FIG. 2 in its final position the adhesive being retained within the point of double-folding.

DETAILED DESCRIPTION OF PREFERRED EMBODIMENT OF THE INVENTION

Referring now more particularly to the drawings, as seen in FIG. 1, a contact body element 10 is shown which is formed of sheet material having a plurality of spaced corrugations 12 extending across the sheet at an angle to the axis of the sheet.

Although the illustrative embodiment shown in FIG. 1 illustrates straight, slanted corrugations, the invention is suitable for use with fill materials made of formed sheets, regardless of the size, shape or configuration of the formations or corrugations thereon.

The sheet material employed may be sheet plastic such as polyethylene, polypropylene, polystyrene, and polyvinyl chloride, ranging in thickness between 0.005 inch and 0.040 inch, or may be made of a glass fiber or other fibrous sheeting, impregnated with a resin (or with resins) such as phenol, melamine, or the like. The longitudinal edges of the corrugated sheet are formed with edge reinforcing plys 14, which are formed by folding the edges 15 of the sheet over on themselves.

As seen in FIG. 2, the longitudinal edge 15 is partially folded over the sheet member 10. An adhesive 16 is applied within the fold 18 in this partially folded position. As seen in FIG. 3, the reinforcing ply 14, is in its final position with the adhesive 16 forming an intermediate layer within the double-fold. This reinforced ply 14, in combination with the addition of the adhesive 16, enables the edge to be substantially more rigid, and accordingly, is able to withstand higher compressive forces. Additionally, the fold will not separate when exposed to high edge erosion, and therefore, it is advantageous over an arrangement wherein the edge is simply folded over. Moreover, the intermediate layer of adhesive 16 makes the edge more rigid and able to substantially withstand high edge erosion.

Any adhesive can be applied to the fold, but in the preferred embodiments, latex, hot melt, epoxy or any similar adhesives can be applied. The adhesive can be of any type having intumescent qualities, which are triggered by heat. Thus, in the event of a fire the heat will cause the intumescent adhesive to expand, pushing ply 14 away from sheet 10 to thereby fill or block the opening between the sheets. This will hinder further access of air to the openings between the sheets and reduce or eliminate the spread of fire.

To facilitate such separation of the reinforcing ply or edge portion 14, the edge may be slit at spaced locations along its length perpendicular to the edge or parallel to the corrugations. This will permit the edge to separate more easily at those portions which are subjected to heat, thereby closing all passages between the sheets at the point of the fire. Such slits are shown, for example, at 20 and 22 in FIG. 1.

This invention makes the addition of an edge bulge of adhesive, a current practice in the art, unnecessary and therefore, makes the manufacture of these contact sheets more economical since the adhesive is added at the same time as the double-folding rather than after.

In another embodiment of the invention, rather than using an adhesive, the double-fold can be welded together, (not shown). The weld will have the same advantages as the edge reinforced with an adhesive, however, the intermediate layer will be the weld rather than the adhesive. This arrangement will also withstand higher compressive forces than standard reinforced edges and will substantially withstand high edge erosion.

Although an illustrative embodiment of the invention has been described in detail herein, it is to be understood that the invention is not limited to the foregoing, and that various modifications and changes may be affected therein by one skilled in the art without departing from the scope or spirit of the invention as defined in the appended claims.

What is claimed is:

1. A contact body element, for use in forming the fill of a gas and liquid contact apparatus to produce interaction between a gas and liquid flowing through the apparatus, comprising formed sheet members, each having integral longitudinally extending edge portions, said edge portions of each said sheet member being folded over on a longitudinally extending surface of the sheet to provide a strip of sheet material located in overlapping relationship to said surface of said sheet with the area between said longitudinally extending edge of said sheet and said longitudinally extending surface forming a fold, and an adhesive applied within said fold for securing the folded over edge portion to the sheet such that said longitudinal edge portion and surface and adhesive form a substantially rigid ply that is substantially resistant to corrosion; said adhesive being an intumescent adhesive and said edge portion having a plurality of longitudinally spaced slits therein.

2. The contact body element as defined in claim 1, wherein said adhesive means is applied within said fold of said longitudinal edge portion at the point of overlap.

3. The contact body element as defined in claim 2, wherein said adhesive means is formed of latex.

4. The contact body as defined in claim 2, wherein said adhesive means is formed of a hot-melt adhesive.

5. The contact body as defined in claim 2 wherein said adhesive means is formed of an epoxy.

* * * * *